(12) United States Patent
Bakry et al.

(10) Patent No.: US 12,447,236 B1
(45) Date of Patent: Oct. 21, 2025

(54) BIOACTIVE IMPLANT

(71) Applicants: Ahmed Samir Ibrahim Bakry, Alexandria (EG); Mona Aly Abdel Latif Abbassy, Alexandria (EG); Walaa Magdy Abdulhamed Ahmed, Jeddah (SA); Amr Ahmed Ahmed Azhari, Jeddah (SA); Khaled Ahmed Mostafa Fawaz, Cairo (EG)

(72) Inventors: Ahmed Samir Ibrahim Bakry, Alexandria (EG); Mona Aly Abdel Latif Abbassy, Alexandria (EG); Walaa Magdy Abdulhamed Ahmed, Jeddah (SA); Amr Ahmed Ahmed Azhari, Jeddah (SA); Khaled Ahmed Mostafa Fawaz, Cairo (EG)

( * ) Notice: Subject to any disclaimer, the term of this patent is extended or adjusted under 35 U.S.C. 154(b) by 0 days.

(21) Appl. No.: 19/184,064

(22) Filed: Apr. 21, 2025

(51) Int. Cl.
*A61L 27/56* (2006.01)
*A61L 27/18* (2006.01)
*A61L 27/44* (2006.01)

(52) U.S. Cl.
CPC ............... *A61L 27/56* (2013.01); *A61L 27/18* (2013.01); *A61L 27/446* (2013.01); *A61L 2300/102* (2013.01); *A61L 2300/112* (2013.01); *A61L 2400/18* (2013.01); *A61L 2420/04* (2013.01)

(58) Field of Classification Search
CPC ........... A61F 2310/00329; A61L 27/56; A61L 27/18; A61L 27/446; A61L 2300/102; A61L 2300/112; A61L 2400/18; A61L 2420/04; A61L 27/10; A61L 2430/12; A61L 2430/02; G02B 5/128
See application file for complete search history.

(56) References Cited

U.S. PATENT DOCUMENTS

2020/0031092 A1* 1/2020 Walker, Jr. ................. B32B 5/22
2021/0260242 A1* 8/2021 Bagga ..................... A61L 27/10

* cited by examiner

*Primary Examiner* — Melanie R Tyson
*Assistant Examiner* — Rebecca Lynee Zimmerman
(74) *Attorney, Agent, or Firm* — WCF IP

(57) ABSTRACT

A bioactive implant has a body formed from PEEK and includes a porous surface layer treated with sulfuric acid to form tiny holes that extend into the implant. Borate glass particles are adhered to the surface of the bioactive implant using a light curable 10-methacryloyloxydecyl dihydrogen phosphate (10-MDP) resin matrix. The bioactive implant can be used for both dental and orthopedic applications.

6 Claims, 11 Drawing Sheets

BIOACTIVE IMPLANT

FIELD OF THE INVENTION

This invention describes a composite formed of polyetheretherketone (PEEK) resin enveloped in a light curing borate adhesive system capable of releasing calcium and phosphate ions to improve the compatibility of the PEEK implants inside the human body.

BACKGROUND

Numerous operations, including spinal fusion, joint fusion, fracture fixation, nonunion repair, and complete hip replacement, involve orthopedic implants which are made from a wide range of materials, such as metal, autogenous bone, ceramic, polymers, and more. However, many of these materials have some shortcomings. For example, although metals have a high modulus of elasticity, use of metals can result in stress shielding. Moreover, metal frequently results in artifacts in X-ray images. In addition, autologous bone flaws at the donor site from autologous bone transplants may result in illness and deformity. Similar to metal, ceramic materials have a high elastic modulus but weak ductility, making them unsuitable for orthopedic implants (Kokubo et al. 2003).

On the other hand, numerous types of polymers exist that can have their characteristics modified. PEEK is a specially designed plastic that exhibits exceptional processing performance, a high melting temperature, a high modulus, high strength, and resistance to corrosion. Additionally, at a range of pressures, temperatures, speeds, and relative roughness contact conditions, PEEK offers exceptional wear resistance.

In the 1980s, researchers from all around the world started looking at PEEK as an orthopedic implant because of the above-described benefits. PEEK's stable chemical characteristics have been demonstrated by numerous investigations (Kurtz and Devine 2007).

However, studies conducted on peek showed poor osseointegration, and inhibition of cell attachment. Furthermore, other investigations demonstrated that PEEK cage' surfaces were enveloped in a fibrous tissue layer (Toth et al. 2006) rather than bone; additionally, there were reports of PEEK cages sinking and migrating from the implantation site.

PEEK has been increasingly employed in craniocerebral reconstruction in recent years (Hanasono et al. 2009) because it can be 3D printed with computer-aided design (CAD) surgical planning (Punchak et al. 2017). However, the drawbacks are also evident; according to some experts, implant failure is mostly driven by poor osseointegration [28] and infection [24, 27]. As a result, it is essential to improve PEEK implants' osseointegration and anti-bacterial properties (Zhao et al. 2016).

In addition, researchers have attempted to increase the surface roughness of PEEK through sulfonation, sandblasting, or hydroxyapatite surface coating, to improve its cell attachment.

The first type of bioactive glass was introduced by professor Larry Hench in the 1960s and it was called the 45S5 bioglass (Hench 1991). 45S5 had the ability to form a hydroxyapatite rich layer capable of interacting with hard and soft tissues (Hench 1991). Bioactive glasses were used mainly in the field of orthopedics and periodontology (Hench 1991; Hulbert S. F. 1987; Yamamuro T. 1990). Literature focused on the use of various compositions of bioactive glasses on bone (Bellucci et al. 2015; Bretcanu et al. 2009; Hu et al. 2009; Stahli et al. 2015) and soft tissues (Mao et al. 2015).

U.S. Pat. No. 10,307,511 to Clineff describes a composite of PEEK and $Na_2Ca_2Si_3O_9$. Other PEEK and combeite glass ceramic $(Na_4Ca_3Si_6O_{16}(OH)_2$ are described in U.S. Pat. Nos. 5,681,872, 5,914,356, and 6,709,744.

SUMMARY

It is an aspect of this invention to combine the excellent mechanical and physical properties of PEEK and the bioactive properties of a bioactive light curing adhesive resin to produce orthopedic and dental implants, as well as other products of interest.

In the practice of the invention, a PEEK resin is coated with a bioactive light curing resin material capable of forming calcium phosphate rich crystals onto its surface, and which exert antibacterial effects through the release of its bioactive ions, in addition to providing a primary stabilization of the implanted material to the surrounding boney structures by its adhesive property.

The described bioactive composite will withstand high mechanical loads and also be capable of releasing calcium and phosphate ions in the composite-bone-soft tissues interface to provide an interactive layer that will allow fast and good integration with the soft and the hard tissues.

DESCRIPTION

Figure 1:
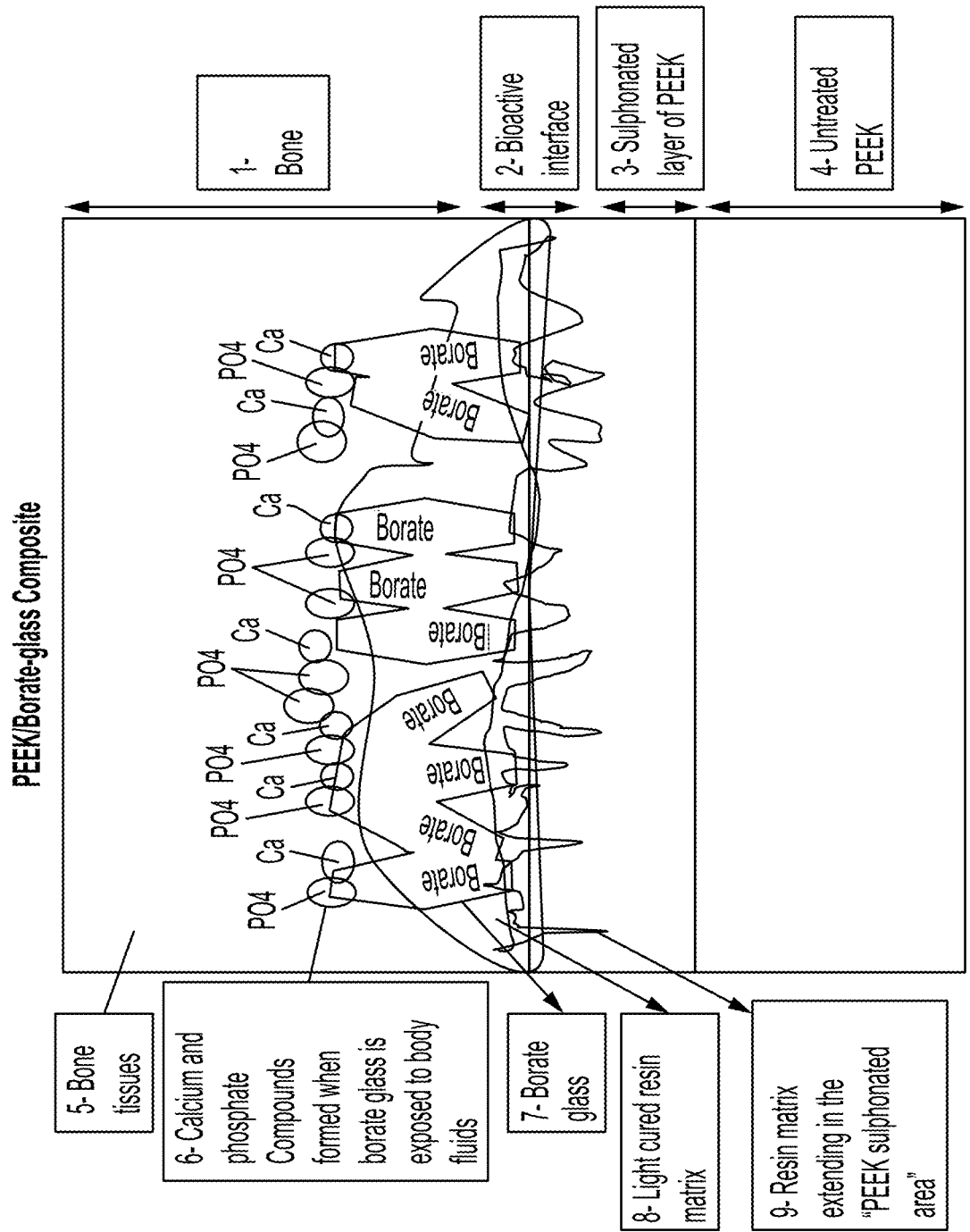
FIG. 1 is a diagram showing an embodiment of the invention which includes an implant made of PEEK where the surface has been sulfonated, and wherein particles of borate glass are adhered to the implant by a light curable resin

FIG. 1 shows an embodiment of the invention wherein an implant made of PEEK has a treated surface 3 of, for example sulfonated PEEK, and an untreated PEEK interior 4. A light curable resin matrix 8 holds borate glass 7 particles on the surface of the implant. Portions 9 of the resin matrix 8 are able to penetrate into the surface treated PEEK 3, thereby providing a firm attachment of the adhered borate glass 7 to the PEEK implant composed of the surface 3 and interior 4. The implant is adhered to bone 1 and the borate glass 7 is exposed to bone tissues 5 and other bodily fluids. Exposure to bodily fluids causes the borate glass 7 to release calcium 6a and phosphate 6b compounds creating a bioactive interface 2 between the implant (3 and 4) and the bone 1.

In its simplest form, the invention is an implant that can be thought of as a bioactive composite comprising the PEEK implant 3 and 4 with at least a portion of the surface coated with a resin matrix 8 holding borate glass 7 in contact with bone 1.

The resin matrix 8 is based on 10-methacryloyloxydecyl dihydrogen phosphate (10-MDP). Preferably it has 0.5 wt %-98 wt % 10-MDP, ethanol (0.5 wt %-98 wt %), and 1 wt % ethyl N,N-dimethyl-4-aminobenzoate (EDMAB) (in combination as the Co-initiator) and 0.25 wt % camphorquinone (CQ) (the Initiator). The hydrophilic functional group of the 10-MDP may provide adequate bonding to tissues rich in water like bone that has a composition water of approximately 15% weight. Moreover, the hydrophobic functional group stabilizes the light polymerized resin and prevents it from instantly dissolving in the surrounding aqueous media. Additionally, previous research showed that the phosphate group in the 10-MDP can interact chemically with calcium in the human hard tissues and form insoluble calcium phosphate compounds and consequently achieve proper bonding between the resin and the hard tissues of the body. 10-MDP can be synthesized according to the following reactions: at first, 10-hydroxydecyl methacrylate is synthesized by reaction of methacrylic acid and 1,10-decanediol. Next, phosphoryl chloride is added to 10-hydroxydecy methacrylate, then, the phosphorus-chlorine bonds in this intermediate are hydrolyzed.

The use of light curable 10-MDP as the resin matrix 8 allows an ambient time for the surgeon to prepare the site of implantation (dental or orthopedic) properly and adjust the exact position for placing the peek implant. Thereafter, the surgeon can easily use a light curing unit, such as those which are available in most any dental department in any hospital in the world, to cure the bioactive resin 8 interface for a suitable time period, e.g., 60 seconds. By contrast, other techniques such as chemically polymerizing the resin will allow extremely limited working time for the surgeon to apply the PEEK implant.

The borate glass 7 functions to produce calcium and phosphate compounds at the interface of the implant, 3 and 4, and the bone 1. High phosphorus content in the implant region is extremely important for formation of new bone. New bone formation leads to a successful osteointegration between the implant 3 and 4, and the bone tissues 1 and 5. Preferably the borate glass comprises a $P_2O_5$ constituent ranging from 5 to 50 mole %, an $Na_2O$ constituent ranging from 5 to 50 mole %, a CaO constituent ranges from 1 to 50 mole %, and a borate ($B_2O_3$) constituent ranging from 5 to 50 mole %. The borate glass will preferably be prepared into small particles of less than 30 μm in size for the largest dimension (e.g., 5-30 μm). The thickness of the resin matrix 8 when applied onto the implant surface 3 is approximately 10-25 microns, and preferably 20-25 microns. Therefore, there will be multiple parts of the bioactive borate glass 7 protruding through the cured bioactive resin matrix 8 which will be exposed to body fluids (e.g., when implanted in a human or other animal). Having the exposed borate glass 7 portions effectively makes the bioactive implant ready to start its bioactive cycle. As discussed in the Example section, this was confirmed experimentally by showing crystal like structures rich in calcium and phosphate formed onto the bioactive resin when stored in simulated body fluid.

Upon implanting the bioactive composite as shown in FIG. 1, a bioactive calcium phosphate rich layer is formed at the interface. As shown in the Example section below, this layer is formed when the borate glass is stored in a simulated body fluid. This layer is mainly composed of calcium and phosphate and in the presence of body fluids will eventually change into hydroxyapatite which is the main structure of the human boney tissues. The FTIR/ATR results of the current experiment showed that the formed layer is the precursor compounds that is formed prior to forming the hydroxyapatite due to observing bands at 560 $cm^{-1}$ and the bands observed at 1001 $cm^{-1}$.

PEEK generally has a molecular weight of 15,000 to 50,000 g/mol. As discussed above, PEEK has toughness and inertness properties that make them good candidates for implants. PEEK is an extremely hydrophobic material that is extremely inert and thus it does not allow the adhesion of cells or growth factors related to the human soft or hard tissues in any implant site in the human body. However, when the light curable resin 8 is applied to a surface of a PEEK implant, it could be peeled from the surface easily after polymerization. Thus, without modification, PEEK is not receptive to other polymeric resin materials although they are both polymeric resins. Hence without modification, it can be expected that PEEK will not have any adherence to biologic tissues such as blood and cells as was demonstrated in previous research. Some manufacturers are currently supplying the PEEK spinal cages with screws and rough surfaces so that the PEEK will not be mobilized from its implant site, as it is inert and will not interact by any means with the soft or the hard tissues). If the spinal cage provided in the following picture had its surface sulphonated (by sulfuric acid as suggested herein) followed by application of the bioactive resin suggested in our patent so, the layer of the bioactive resin will provide a strong interface between the bone and the PEEK implant that will provide a primary stabilization as soon as we place the implant in place. In the practice of the invention, the surface a PEEK implant is made porous by exposure to acid (e.g., concentrated sulfuric acid, concentrated phosphoric acid, etc.). The implant is exposed to the acid for a limited period of time such that, as shown in FIG. 1, a surface layer 3 is formed on the surface of the implant 4. This surface layer 3 may be 20-100 μm thick. It should be sufficiently thick so as to enable the resin matrix 8 to penetrate into the surface layer such that it will hold fast to the surface 3 and not peel off easily. That is, the surface of PEEK is extremely impermeable thus one needs to apply sulfuric acid onto its surface first for few seconds and then apply the low viscosity bioactive borate resin that will penetrate the outer superficial porous area of the PEEK and polymerize into these tiny holes creating resin tag projections that will aid in the retention of the bioactive resin to the PEEK surface.

Figure 2A:
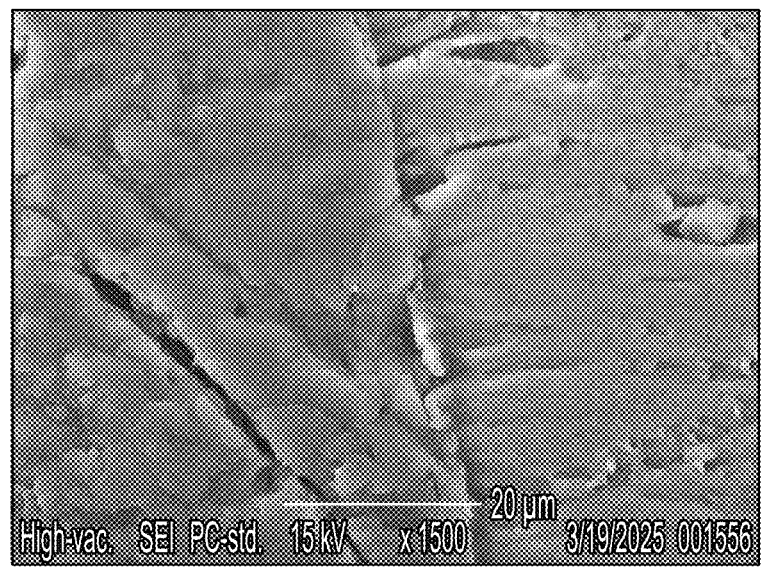
FIG. 2A is a scanning electron microscopy (SEM) image of bone and bioresin material firmly abutting each other when placed in a medium representative of bodily fluids.
Figure 2B:
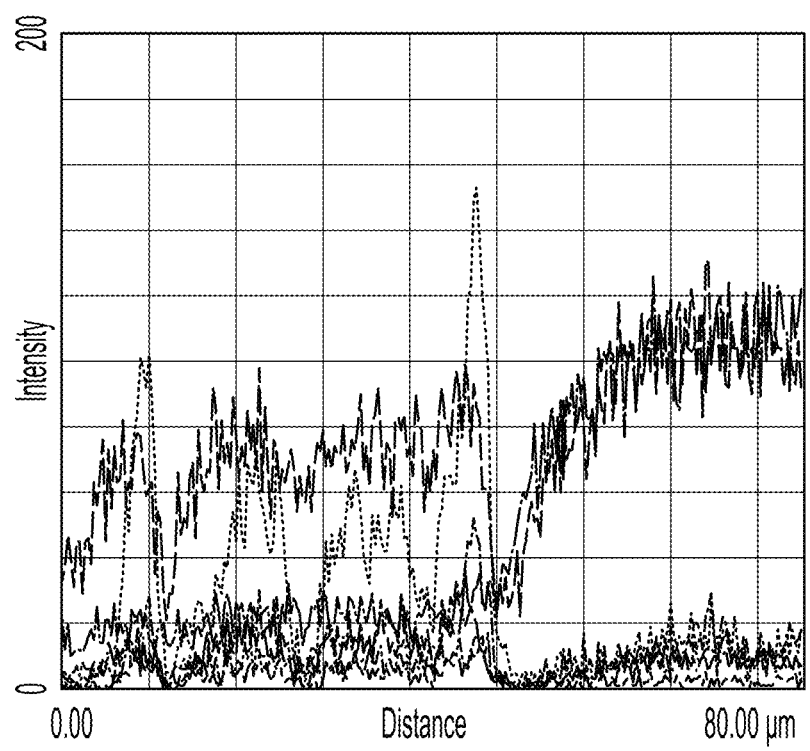
FIG. 2B is a spectroscopy graph showing high content of posphorous in the bioresin material.

FIG. 2A shows a scanning electron micrograph (SEM) showing bioactive resin abutting against bone when bone together with the borate bioactive light curing resin were stored for 24 hours in Dulbecco's modified Eagle's medium in an incubator adjusted to 37° C. FIG. 2B shows the bioactive resin layer showed a high content of phosphorus, and FIG. 2A shows complete integration with the bone surface with no gaps. High content of phosphorus in the implant region is important for formation of new bone which may suggest that there will be a successful osteointegration between the bioactive PEEK composite and the bone tissues.

PEEK implants, made as bioactive implants as described herein can be used in a wide variety of applications. For example, they may be employed in vertical bone restoration in dentistry, they can be used on spinal cages in orthopedics, etc. There are a number of advantages for the bioactive implants including without limitation, the formed calcium-phosphate rich layer will have the capability of firmly being attached to all PEEK surfaces (Due to Sulphonation); the bioactive composite will provide primary stability for the PEEK onto the bone recipient site, due to the ability of the resin to light polymerize within 60 seconds of applying the light curing unit, moreover, 10-MDP molecules will bond to calcium ions present in the surrounding bone tissues; the interface between the bioactive composite and bone is rich in phosphate compounds which are the main prerequisites for the growth of bone; and excellent mechanical properties due to the ability to utilize PEEK may allow various applications in load bearing areas.

EXAMPLE

Method of Manufacturing the Borate Glass

An exemplary, borate-based bioactive glass borate glass useable in the practice of the invention will generally be in particulate form from 1-30 microns in size and will have a formula of $24.4Na_2O$—$2.6P_2O_5$—$46.1B_2O_3$ in mol %. Generally, the $Na_2O$ constituent ranges from 5 to 50 mole %, the CaO constituent ranges from 1 to 50 mole %, and the $B_2O_3$ borate constituent ranges from 5 to 50 mole %. The glass was prepared by a conventional melt-quenching method. The reagent grade $Na_2CO_3$, $CaCO_3$, $H_3BO_4$ and $NaH_2PO_4 2H_2O$ were mixed as the glass yield of 30 g by using an aluminum mortar. The resulting mixture was put in a Pt crucible and then heated in an electric furnace in air for 1 h at 1450° C. The melt was quenched by pouring it on a stainless steel plate and pressed with another plate to obtain glass plate pieces with the thickness of 0.2-1 mm. Glass particles were obtained by crushing the glass using a porcelain mortar and pestle. The glasses were pulverized (less than 30 micron) using agate planetary mill.

Synthesis of Borate Resin Bonding Agent

The Borate glass was incorporated at different concentrations (0.5 wt %-98 wt %) into an exemplary resin blend comprising (0.5 wt %-98 wt %) 10-methacryloyloxydecyl dihydrogen phosphate (10-MDP), ethanol (0.5 wt %-98 wt %), and 1 wt % ethyl N,N-dimethyl-4-aminobenzoate (EDMAB) (in combination as the Co-initiator) and 0.25 wt % camphorquinone (CQ) (the Initiator). The whole mixture was placed in opaque bottles and mixed using vibrator and ultrasonic bath till it was homogenous. This bioactive resin is basically composed of the borate bioactive particles that is responsible for the bioactivity of the system, while the resin is mainly based on 10-MDP monomer that has hydrophobic and hydrophilic functional groups.

Synthesis of Polyethylethyletherketone (PEEK)

4,4'-Difluorobenzophenone (DFBP)A monomer containing fluorine and benzophenone hydroquinone are the main components of PEEK. A polar aprotic solvent, such as (diphenyl sulfone) is used to dissolve the DFBP then the benzophenone hydroquinone is mixed with the dissolved DFBP in a high-temperature reactor under an inert atmosphere (e.g., nitrogen) to prevent oxidation, the temperature range may be 250-350° C. to ensure complete polymerization. The polymer is precipitated from the solvent by cooling the reaction mixture, then it is washed with water and other solvents to remove impurities, unreacted monomers, and byproducts. The purified PEEK is then dried to remove residual moisture and solvents. The dried polymer is extruded and cut into small pellets, which are the standard forms for further processing, which may include injection molding, extrusion, compression molding, and 3D Printing. The approximate density of the PEEK is 1.30 g/cc, the tensile yield strength is 98 MPa, Flexural strength is 165 MPa, and flexural modulus 3.80 GPa. PEEK pellets are also commercially available from a large number of companies.

Bone Specimens' Preparation

In an exemplary demonstration of the applicability of the invention to implants which may be used in humans and animals, animal protocols were approved by the Institutional Animal Care and Use Committee of King Abdulaziz University, and the experiment was carried out under the control of the University's Guidelines for Animal Experimentation. 8 tibia bones were obtained from 4 male Wistar rats. The tibia bones were embedded in epoxy resin. The embedded tibia bones were cross sectioned by a low speed saw to expose the cross-section area of the Tibia.

Borate Glass-Resin Light Curing Resin System Application on the PEEK 28 peek specimens were utilized and divided into four groups. All specimens were stored for 24 hours in Dulbecco's modified Eagle's medium in an incubator adjusted at 37° C.

Group I: 7 PEEK specimens received no treatment.

Group II: 7 PEEK specimens were sulfonated with concentrated sulfuric acid (10 seconds-120 seconds) rendering the outer surface porous, and the specimens received no further treatment.

Group III: 7 PEEK specimens were sulfonated with concentrated sulfuric acid (10 seconds-120 Seconds) rendering the outer surface porous, followed by applying the borate glass-resin light curing resin system, and then light cured for 60 seconds.

Group IV: 7 PEEK specimens had the borate glass-resin light curing resin system applied and then light cured for 60 seconds.

Borate Glass-Resin Light Curing Resin System Application on the Bone

The embedded cross-sectional area of the tibia had the borate glass resin light curing resin system applied and light cured for 60 seconds. All specimens were stored for 24 hours in Dulbecco's modified Eagle's medium in an incubator adjusted at 37° C. The whole interface was embedded in epoxy resin and then cross sectioned across the interface.

SEM/EDS Interface Examination for the Bone-Borate Glass-Resin Light Curing Resin System All specimens were sectioned perpendicular to the interface to give 1.5-mm-thick slabs. The cut surfaces were polished, (Bakry et al., 2007), gold-coated, and then examined SEM/EDS. Line scans were done across the interface to examine the following elements: phosphate, calcium, carbon and Boron.

Sem/EDS Top Surface Examination for the PEEK after Various Treatments.

All specimens were dried, gold-coated, and then examined SEM/EDS. EDS area analysis was done to examine the following elements: phosphate, calcium, carbon and Boron.

Shear Bond Strength Test 20 peak specimens were utilized to test the retention of the bioactive resin borate layer to the PEEK surface. The specimens were milled using a milling machine to give cylinders of 3 cm diameter and 3 cm height. The specimens were grouped into two groups; (Control Group) in which we utilized the milled surface of the PEEK, and the other (treated by sulfuric acid group) had sulfuric acid applied for 30 seconds then thoroughly washed. All specimens were etched with 37% phosphoric etching gel (3M Unitek, Monrovia, CA, USA) followed by applying the bioactive borate light curing resin onto the PEEK surface followed by light curing for 60 seconds. For all of the specimens building up of composite resin (Tetric N Ceram composite Bulkfill; Ivoclar Vivadent AG, Schaan, Liechtenstein) was carried out onto the PEEK bonded surfaces by applying the composite resin into teflon tubes having a height of 3 mm and a 3 mm diameter. The composite resin was light cured by a light curing unit for 30 s.

Figure 3A:
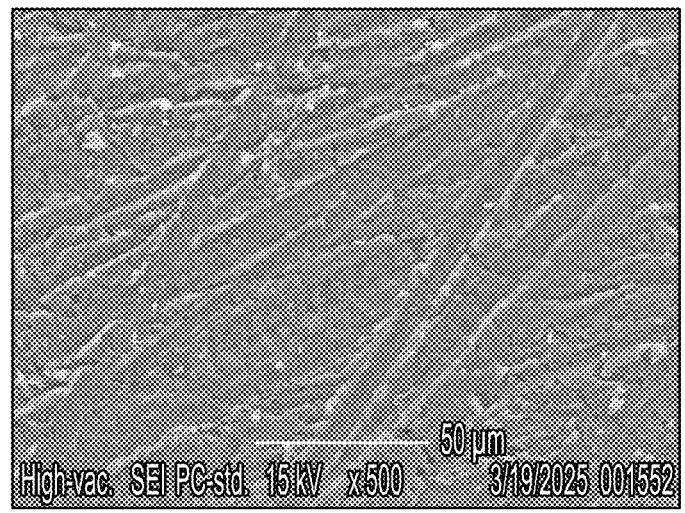
FIG. 3a-b, FIG. 3c-d, FIG. 3e-f, and FIG. 3g-h respectively show panels of scanning electron microscopy (SEM) images paired with attenuated total reflectance four transform infrared (FTIR-ATR) spectroscopy graphs for four different groups of PEEK specimens tested.
Figure 3B:
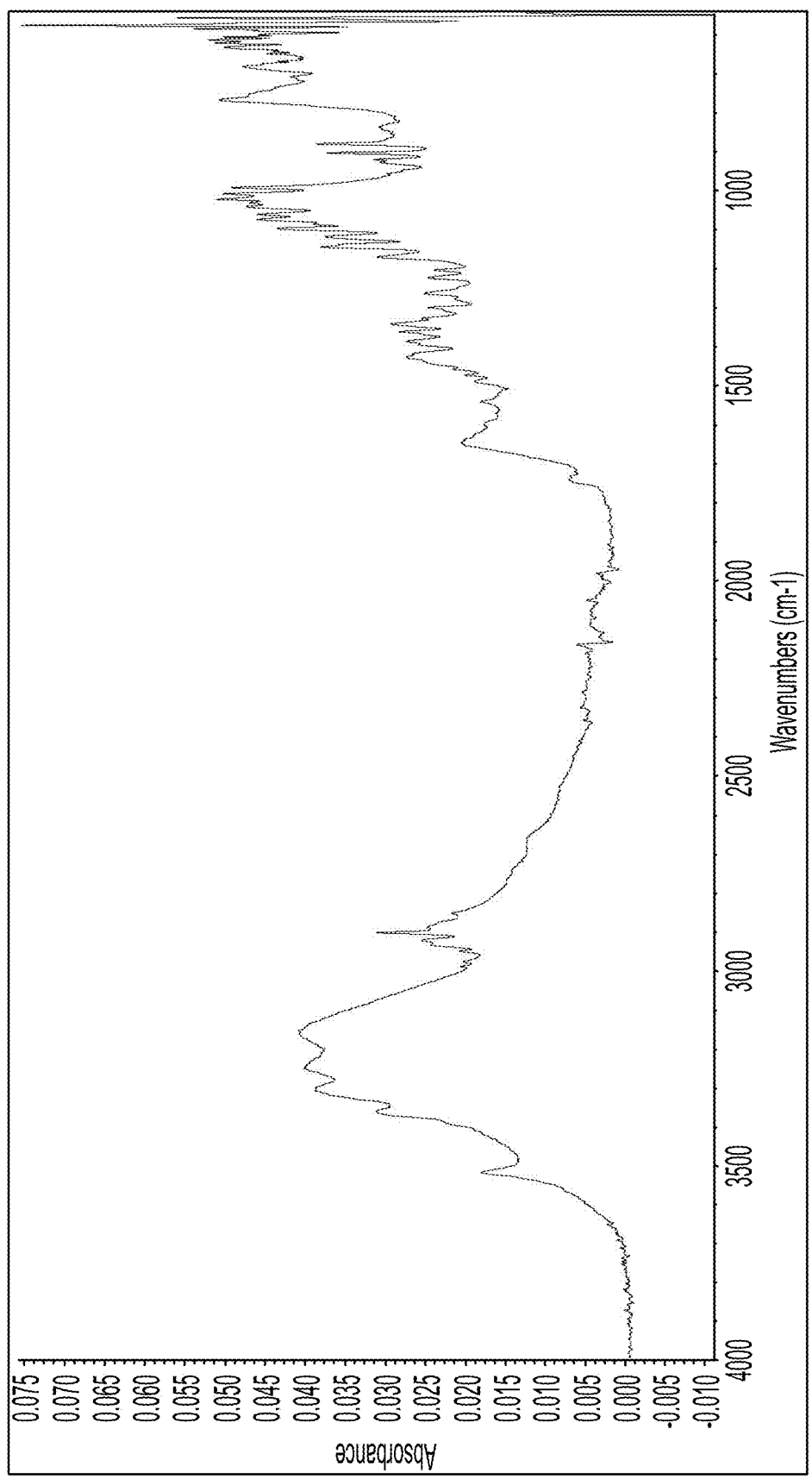
Figure 3C:
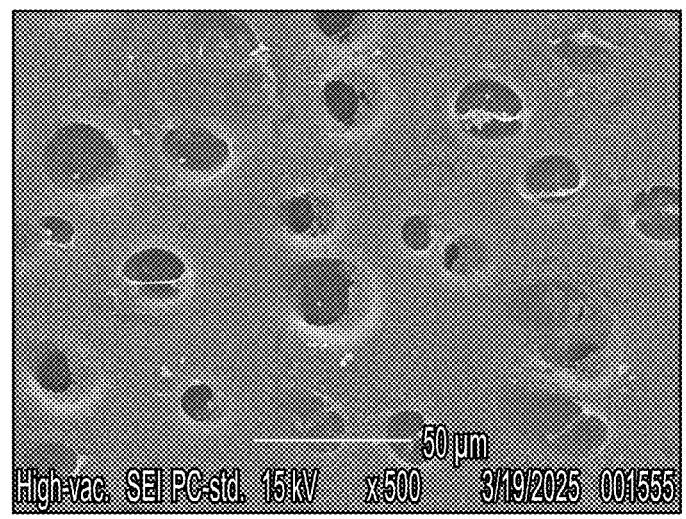
Figure 3D:
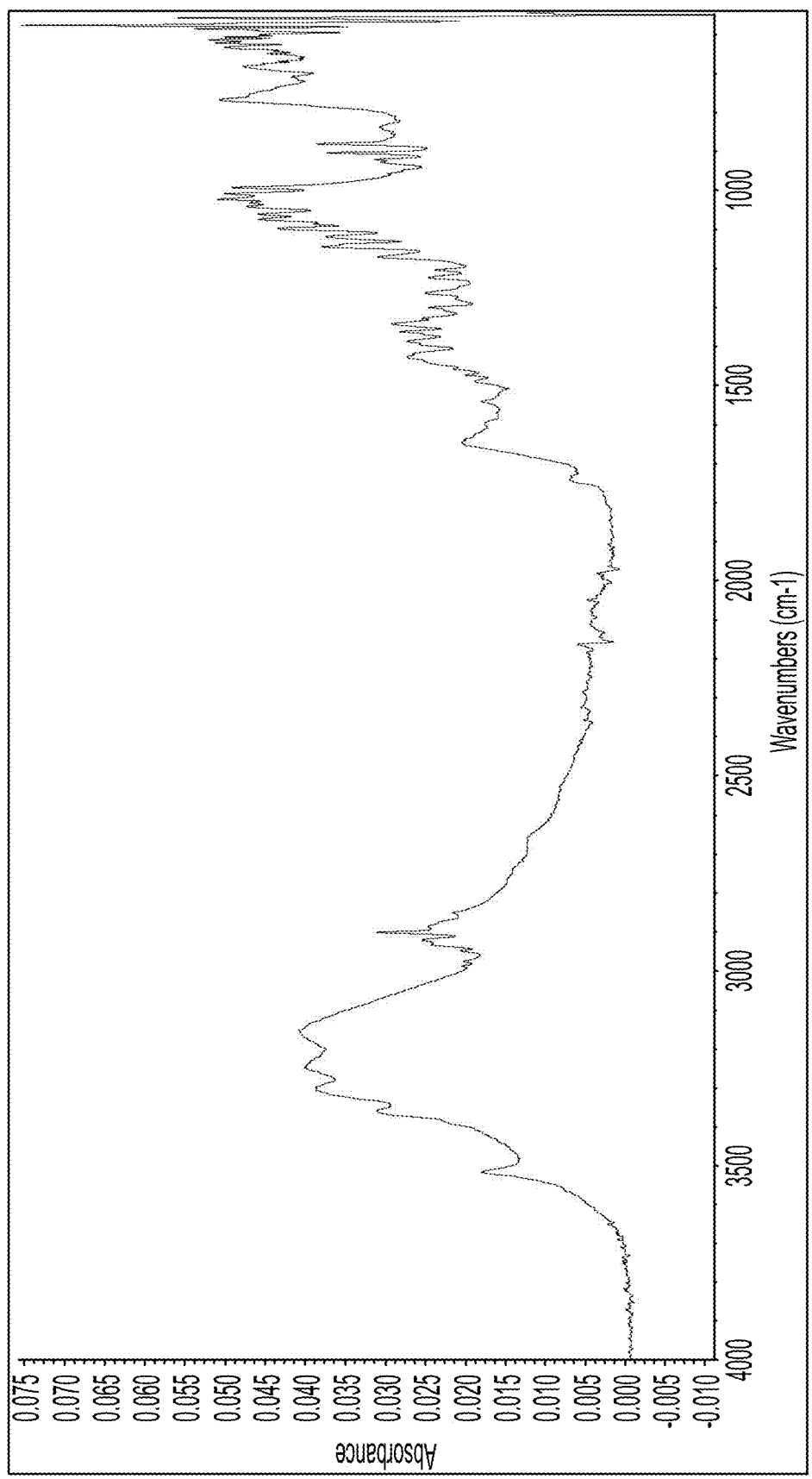
Figure 3E:
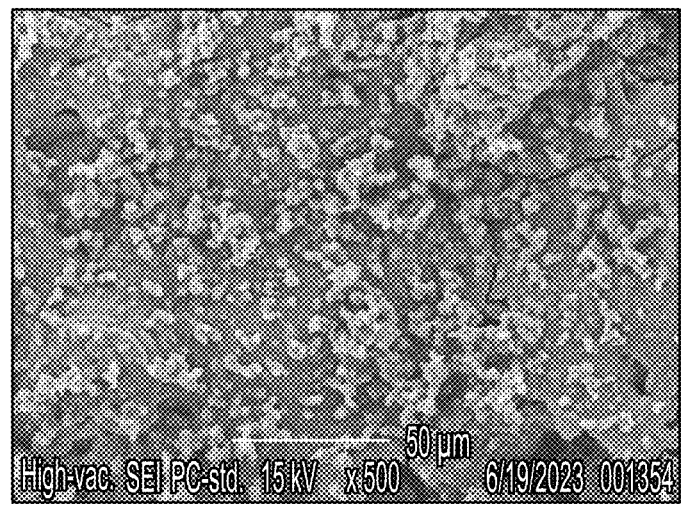
Figure 3F:
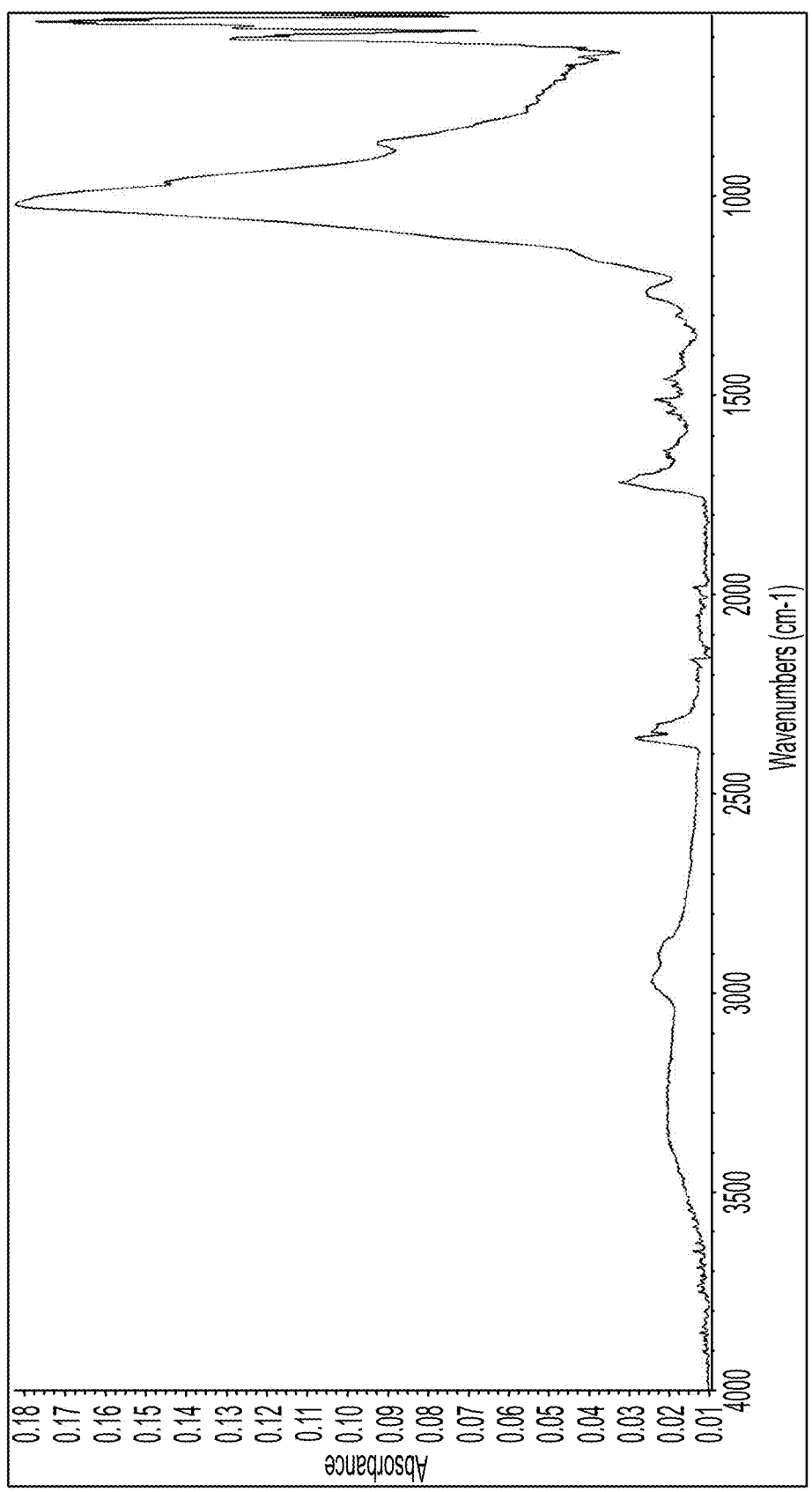
Figure 3G:
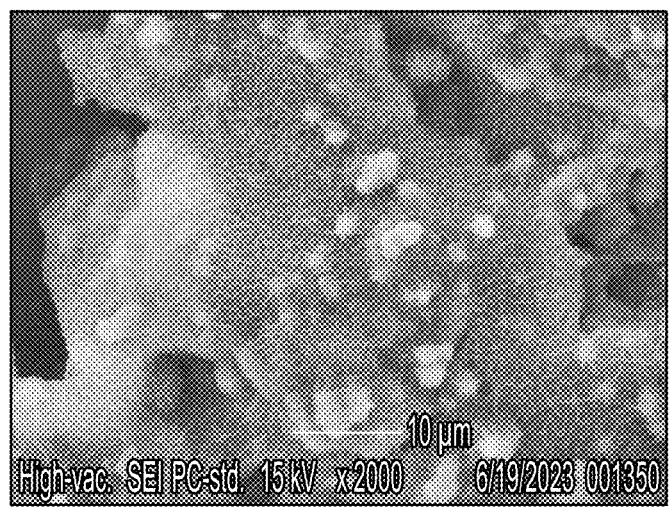
Figure 3H:
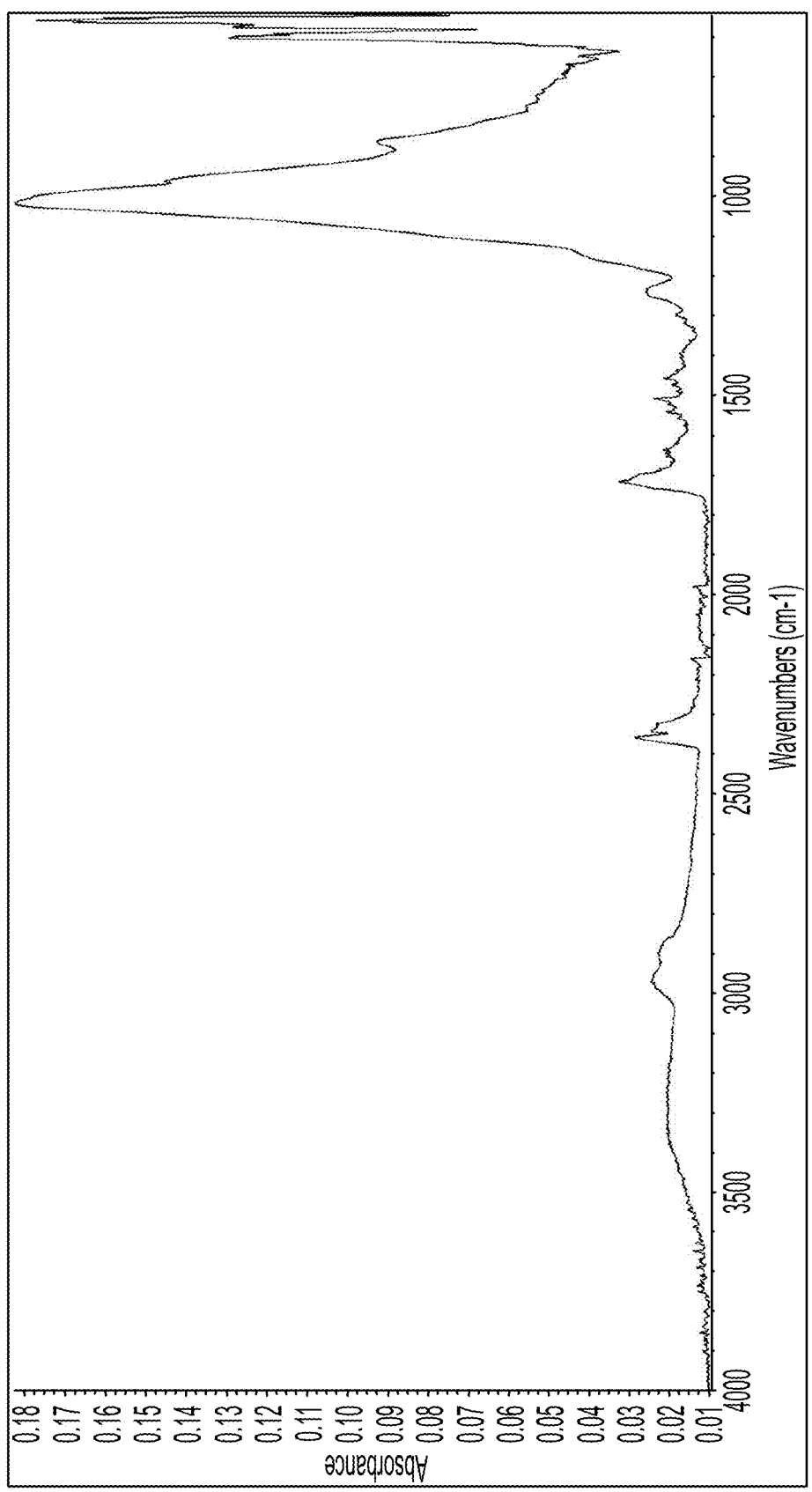

A universal testing machine (Instron Machine, 5900 Series Mechanical Testing System) was utilized to perform the shear bond strength test between the Borate adhesive resin and the PEEK surface. The crosshead speed utilized was 0.5 mm/min and the shear bond strength was calculated in Mega pascal Results FIGS. 3a, 3c, 3e, and 3g show the SEM surface results for the PEEK for the four groups described above. With Group I, FIG. 3a, the as received PEEK showed no evidence of forming calcium or phosphate compounds on its surface after 24 hours in Dulbecco's modified Eagle's medium (Inert surface). With Group II, FIG. 3c, the outer surface is porous with no evidence of forming calcium or phosphate compounds on its surface after 24 hours in Dulbecco's modified Eagle's medium. With Group III, FIG. 3e, which included application of the light curing bioactive resin and curing for 60 seconds, after storage in Dulbecco's modified Eagle's medium (DMEM) and maintained at 37° C. for 24 hours, the surface was covered by crystal like deposits after 24 hours. FTIR/ATR analysis graph, FIG. 3f, demonstrated that a bioactive apatite calcium phosphate-rich layer was formed as demonstrated by the bands at 560 $cm^{-1}$ and the bands observed at 1001 $cm^{-1}$. With Group IV, FIG. 3g, which included application of the light curing bioactive resin and curing for 60 seconds, and storage in Dulbecco's modified Eagle's medium (DMEM) and maintained at 37° C. for 24 hours, the surface was covered by crystal like deposits after 24 hours. FTIR/ATR analysis, FIG. 3h, demonstrated that a bioactive apatite calcium phosphate-rich layer was formed as demonstrated by the bands at 560 $cm^{-1}$ and the bands observed at 1001 $cm^{-1}$. No such FTIR/ATR results were demonstrated in FIG. 3b and FIG. 3d.

In summary, the as received PEEK showed no evidence of forming calcium or phosphate compounds on its surface after 24 hours in Dulbecco's modified Eagle's medium (Inert surface). (B) Group II the outer surface is porous with no evidence of forming calcium or phosphate compounds on its surface after 24 hours in Dulbecco's modified Eagle's medium. (C) Group III Application of the light curing bioactive resin and curing for 60 seconds. Storage in Dulbecco's modified Eagle's medium (DMEM) and maintained at 37° C. for 24 hours. The surface was covered by crystal like deposits after 24 hours. FTIR/ATR analysis demonstrated that a bioactive apatite calcium phosphate-rich layer was formed due to observing bands at 560 $cm^{-1}$ and the bands observed at 1001 $cm^{-1}$. (D) Group III Application of the light curing bioactive resin and curing for 60 seconds. Storage in Dulbecco's modified Eagle's medium (DMEM) and maintained at 37° C. for 24 hours. The surface was covered by crystal like deposits after 24 hours. FTIR/ATR analysis demonstrated that a bioactive apatite calcium phosphate-rich layer was formed due to observing bands at 560 $cm^{-1}$ and the bands observed at 1001 $cm^{-1}$.

Figure 4:
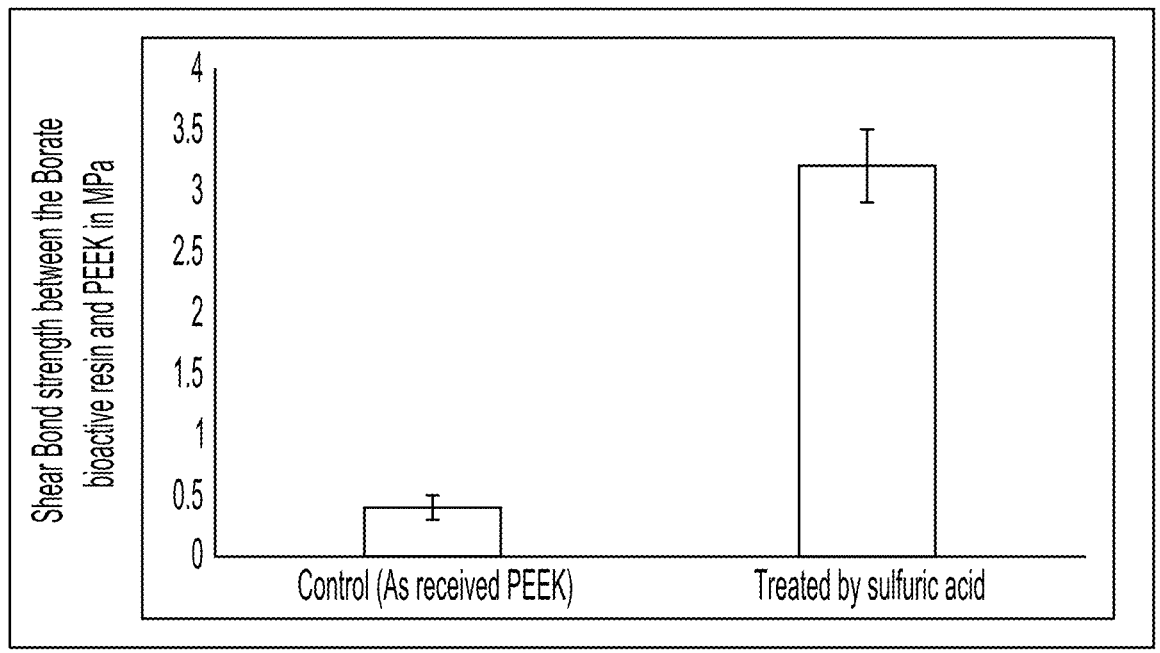
FIG. 4 is a graph showing the shear bond strength between the borate bioactive resin and PEEK in MPa.

FIG. 4 shows the retention of the borate bioactive light curing resin was significantly improved after application of the sulfuric acid to the PEEK surface, due to the creation of multiple porosities on the surface of the PEEK that was partially infiltrated by the bioactive resin material. This means that using the described technique the PEEK surface will be enveloped by a bioactive resin layer that will not be detached (peeled out) when inserting the (PEEK-Borate resin) into the implant site in the human body. Moreover, it may allow the on site repair of any surface of PEEK that will have the bioactive resin layer detached as it will allow instantaneous and the safe retention of the bioactive layer to the PEEK surface.

REFERENCES

ADDIN EN.REFLIST Bellucci D, Sola A, Anesi A, Salvatori R, Chiarini L, Cannillo V. 2015. Bioactive glass/hydroxyapatite composites: Mechanical properties and biological evaluation. Mater Sci Eng C Mater Biol Appl. 51:196-205.

Bretcanu O, Misra S, Roy I, Renghini C, Fiori F, Boccaccini A R, Salih V. 2009. In vitro biocompatibility of 45s5 bioglass-derived glass-ceramic scaffolds coated with poly (3-hydroxybutyrate). J Tissue Eng Regen Med. 3(2):139-148.

Hanasono M M, Goel N, DeMonte F. 2009. Calvarial reconstruction with polyetheretherketone implants. Ann Plast Surg. 62(6):653-655.

Hench L L. 1991. Bioceramics—from concept to clinic. Journal of the American Ceramic Society. 74(7):1487-1510.

Hu S, Chang J, Liu M, Ning C. 2009. Study on antibacterial effect of 45s5 bioglass. J Mater Sci Mater Med. 20(1): 281-286.

Hulbert S. F. BJC, Hench L. L., Wilson J., Heimke G. 1987. Ceramics in clinical applications: Past, present, and future. Amesterdam, Netherlands: Elsevier.

Kokubo T, Kim H M, Kawashita M. 2003. Novel bioactive materials with different mechanical properties. Biomaterials. 24(13):2161-2175.

Kurtz S M, Devine J N. 2007. Peek biomaterials in trauma, orthopedic, and spinal implants. Biomaterials. 28(32): 4845-4869.

Mao C, Chen X, Miao G, Lin C. 2015. Angiogenesis stimulated by novel nanoscale bioactive glasses. Biomed Mater. 10(2):025005.

Punchak M, Chung L K, Lagman C, Bui T T, Lazareff J, Rezzadeh K, Jarrahy R, Yang I. 2017. Outcomes following polyetheretherketone (peek) cranioplasty: Systematic review and meta-analysis. J Clin Neurosci. 41:30-35.

Stahli C, James-Bhasin M, Hoppe A, Boccaccini A R, Nazhat S N. 2015. Effect of ion release from cu-doped 45s5 bioglass(r) on 3d endothelial cell morphogenesis. Acta Biomater. 19:15-22.

Toth J M, Wang M, Estes B T, Scifert J L, Seim H B, 3rd, Turner A S. 2006. Polyetheretherketone as a biomaterial for spinal applications. Biomaterials. 27(3):324-334.

Yamamuro T. HLL, Wilson J. 1990. Handbook of bioactive ceramics, vol ii: Calcium phosphate and hydroxyl apatite ceramics. Boca Raton, Florida: CRS Press.

Zhao Y, Wong H M, Lui S C, Chong E Y, Wu G, Zhao X, Wang C, Pan H, Cheung K M, Wu S et al. 2016. Plasma surface functionalized polyetheretherketone for enhanced osseo-integration at bone-implant interface. ACS Appl Mater Interfaces. 8(6):3901-3911.

The invention claimed is:
1. A bioactive implant, comprising
a body formed from polyarylene ether ether ketone (PEEK), wherein said body has an untreated, nonporous interior, and a porous surface layer;
a light curable 10-methacryloyloxydecyl dihydrogen phosphate (10-MDP) resin matrix having an implant contacting surface applied to at least a portion of the porous surface layer of said body, and having a site contacting surface spaced away from the porous sur- face layer of said body by a thickness of the light curable 10-MDP resin; and a plurality of borate glass particles distributed within the light curable 10-MDP resin matrix, wherein at least a portion of the plurality of borate glass particles extend outward from the site contacting surface of the light curable 10-MDP resin matrix such that they are positioned to contact bone at an implant site without being covered by the light curable 10-MDP resin matrix, wherein the plurality of borate glass particles produce calcium and phosphate compounds when exposed to body fluids of a human or other animal.

2. The bioactive implant of claim 1 wherein the porous surface layer of PEEK is 20-100 μm thick.

3. The bioactive implant of claim 2 wherein the porous surface layer of PEEK is sulfonated and is formed by exposure to concentrated sulfuric acid.

4. The bioactive implant of claim 1 wherein the light curable 10-MDP resin is 10-25 μm thick.

5. The bioactive implant of claim 4 wherein the plurality of borate glass particles are 5-30 μm in size.

6. The bioactive implant of claim 1 wherein the porous surface layer of PEEK is 20-100 μm thick, wherein the light curable 10-MDP resin is 10-25 μm thick, and wherein the plurality of borate glass particles are 5-30 μm in size.

* * * * *